Patented Jan. 24, 1933

1,895,105

UNITED STATES PATENT OFFICE

CURT RÄTH, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK

PYRACRIDONE AND PROCESS OF MAKING SAME

No Drawing. Application filed September 24, 1929, Serial No. 394,929, and in Germany September 29, 1928.

The present invention relates to a process of preparing pyracridones and to new products obtainable thereby, more particularly it relates to compounds of the probable general formula

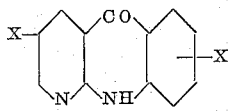

wherein the X's stand for hydrogen which may be substituted by the nitro or amino groups.

According to my invention pyracridone is prepared by heating about molecular quantities of a 2-halogen-pyridine with free 3-position and anthranilic acid for about several hours to an elevated temperature, say to about 100° to 160° C., the most favorable temperature being about 150° C. If desired the reaction may be carried out in a high boiling organic solvent, such as xylene.

On treating the pyracridone thus obtained with a nitrating agent such as nitrating acid in sulfuric acid solution, favorably at temperatures of at most 50° C., a dinitropyracridone is obtained in form of a canary-yellow powder. On treating the dinitro compound with a reducing agent, for example by heating the same in concentrated hydrochloric acid solution with stannous chloride, the corresponding diamino compound is obtainable.

The following examples illustrate my invention without limiting it thereto:—

*Example 1.*—121 grams of anthranilic acid and 101 grams of freshly distilled 2-chloropyridine are slowly heated in an oil bath to a temperature of 150° C. At this temperature the reaction mixture liquefies and slowly begins to boil while evolving carbon dioxide. After two hours the liquid solidifies to form a reddish-yellow mass which is kept for about half an hour at 150° C. After cooling the reaction product is dissolved in concentrated hydrochloric acid and the pyracridone formed is precipitated by the addition of alkali. The precipitate is filtered and washed with water containing ammonia. By recrystallizing the precipitate from methyl alcohol the pyracridone is separated from 2-anilidopyridine formed as by-product. The pyracridone is obtained in form of light yellow anthraquinone-like needles of the melting point 210° C. Yield about 40%.

*Example 2.*—To a solution of 10 grams of pyracridone in 100 ccm. of concentrated sulfuric acid there is slowly added a mixture consisting of 100 grams of nitric acid of the specific gravity of 1.4 and 150 grams of concentrated sulfuric acid, care being taken that the temperature does not exceed 50° C. After standing for about 12 hours the deeply red colored liquid is introduced into the sixfold quantity of ice water. Then the solution is neutralized with ammonia, until it is weakly acid to Congo; the dinitro derivative precipitates in form of a canary-yellow crystalline powder having a melting point of 282° C.; yield about quantitative. It is very difficultly soluble in water and diluted mineral acids, moderately soluble in alcohol, glacial acetic acid and easily soluble in acetone.

*Example 3.*—20 grams of dinitropyracridone are slowly introduced into a solution of 120 grams of stannous chloride in 1000 ccm. of concentrated hydrochloric acid and the mixture is heated on a boiling water bath for about two hours. On cooling the difficultly soluble tin double salt separates in form of a yellowish brown precipitate. It is filtered, the filtrate is suspended in 2-n-hydrochloric acid and detinned, favorably electrolytically. On standing there separates from the solution the bulk of the di-hydrochloride in form of greenish yellow, silky needles. The remainder can be precipitated by the addition of acetone. On heating the salt sinters and becomes darker and darker at temperatures above 250° C., and finally decomposes. The free base is obtainable from the aqueous solution of the di-hydrochloride by the addition of ammonia in form of light yellow lustrous needles having a melting point of 297° C. after recrystallization from water. It is easily soluble in the usual organic solvents; yield 45–50%.

I claim:—

1. The process which comprises heating about molecular quantities of a 2-halogen pyridine with free 3-position and anthranilic acid to about 100° to 160° C. for several hours.

2. The process which comprises heating about molecular quantities of 2-chloro-pyridine and anthranilic acid to about 150° C. for several hours.

3. As new products pyracridone compounds of the probable general formula

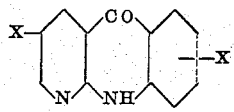

wherein the X's stand for substituents of the group consisting of the nitro and amino groups.

In testimony whereof, I affix my signature.

CURT RÄTH. [L. S.]